United States Patent
Hansen

[11] 3,710,902
[45] Jan. 16, 1973

[54] SELF-COOLING CLUTCH AND BRAKE
[76] Inventor: Quinten A. Hansen, 4338 Hy 38, Franksville, Wis. 53126
[22] Filed: Nov. 26, 1971
[21] Appl. No.: 202,264

Related U.S. Application Data
[62] Division of Ser. No. 56,905, July 21, 1970, Pat. No. 3,653,477.

[52] U.S. Cl. ............................. 192/18 A, 192/85 AA
[51] Int. Cl. ........................................... F16d 67/02
[58] Field of Search...192/18 A, 18 R, 87.17, 85 AA, 192/99 A, 91 S

[56] References Cited
UNITED STATES PATENTS

| | | | |
|---|---|---|---|
| 3,189,147 | 6/1965 | Holdeman | 192/99 A |
| 3,491,863 | 1/1970 | Karlsson et al. | 152/18 A |
| 3,592,318 | 7/1971 | Lyons et al. | 192/18 A |
| 2,796,159 | 6/1957 | Connors | 192/18 R |

*Primary Examiner*—Charles J. Myhre
*Assistant Examiner*—Randall Heald
*Attorney*—James E. Nilles

[57] ABSTRACT

A rod which operates the disks of a clutch or brake is provided at its ends with pistons which, in each operation, pump coolant from a sump and eject it onto the disks for the cooling thereof. The same pistons may constitute fluid pressure means for the operation of the rod.

4 Claims, 7 Drawing Figures

PATENTED JAN 16 1973 3,710,902

SELF-COOLING CLUTCH AND BRAKE

CROSS REFERENCE

This application is a division of application Ser. No. 56,905, filed July 21, 1970, entitled Self-Cooling Clutch and Brake, which issued as U.S. Pat. No. 3,653,477.

BACKGROUND OF THE INVENTION

A clutch and/or brake which is heavily loaded may have its disk pack or packs become overheated unless provision is made for the cooling thereof. The more often the disks are cycled the greater will be the tendency to heat. Inasmuch as the instant device pumps coolant over the disks in each operation, it will be apparent that the greater the tendency to heat the greater will be the cooling effect.

SUMMARY OF INVENTION

As will be shown, the pressure plate may be operated manually or by fluid pressure in one or both directions of movement. In one or both directions the rod connected with the plate-actuating yoke pumps coolant from a sump and delivers it to a pressure duct in the driven shaft to be ejected through appropriate nozzles onto the disks of the pack. In the preferred arrangement, the yoke is actuated by a rod which has a piston at each end. The pistons operate in appropriate cylinders supplied with air or liquid for the actuation of the yoke. The opposite ends of the respective cylinders have check valved connections from a sump and to a chamber encircling the driven shaft. From that chamber a pressure duct within the shaft receives coolant for delivery to the respective disks packs of a clutch and brake.

DETAILED DESCRIPTION

Figure 1:
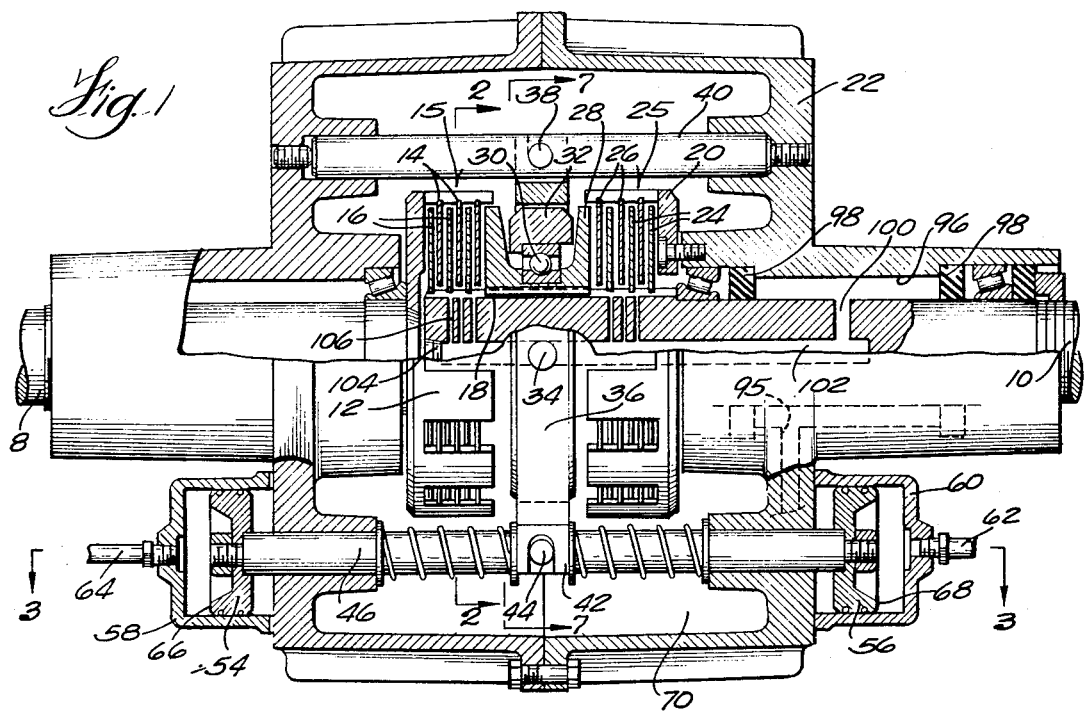
FIG. 1 is a view partially in side elevation but largely in axial section through a combination clutch and brake assembly having cooling means in accordance with the invention.

In the exemplification shown in FIG. 1, there is a power input shaft at 8 and an output shaft at 10. The input shaft carries a clutch spider 12 engaged with alternate disks 14 of a disk pack 15 which has intervening disks 16 keyed to a splined sleeve 18 on the driven shaft 10.

The clutch spider 20 is fixed to the housing 22 and carries disks 24 of a disk pack 25, the intervening disks 26 being keyed by the aforesaid splined sleeve 18 on driven shaft 10.

Between the disk packs 15 and 25 is a spool-shaped pressure plate 28 reciprocable to engage either disk pack. It is actuated by means of a bearing 30 mounted in a ring 32 fulcrumed on a a pair of cross pins 34 to a lever yoke 36 pivoted at 38 to a reaction rod 40 mounted in the housing 22.

Figure 5:
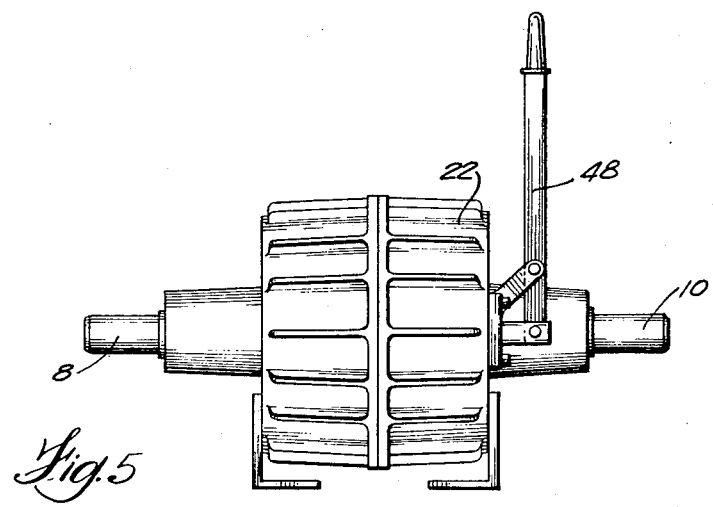
FIG. 5 is a side elevational view of a modified embodiment designed for operation manually rather than by fluid pressure.
Figure 6:
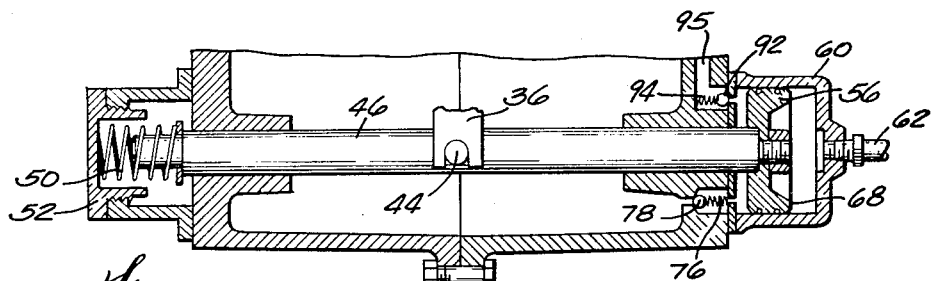
FIG. 6 is a view similar to a portion of FIG. 1 showing a modified embodiment wherein the yoke is spring-actuated in one direction.
Figure 2:
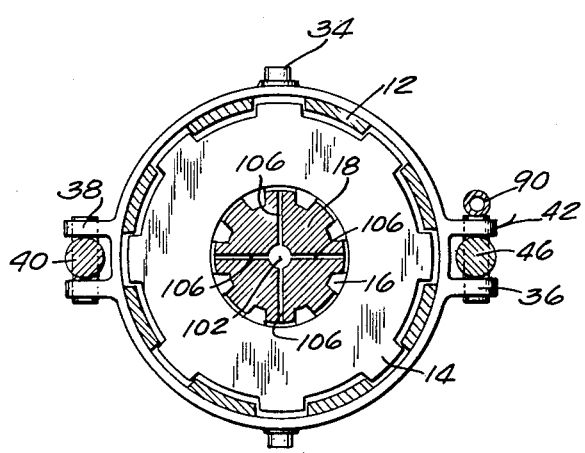
FIG. 2 is a view in transverse section on the line 2—2 of FIG. 1.
Figure 4:
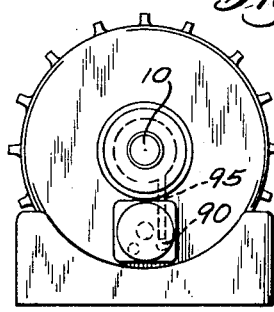
FIG. 4 is a view of the apparatus in end elevation.
Figure 7:
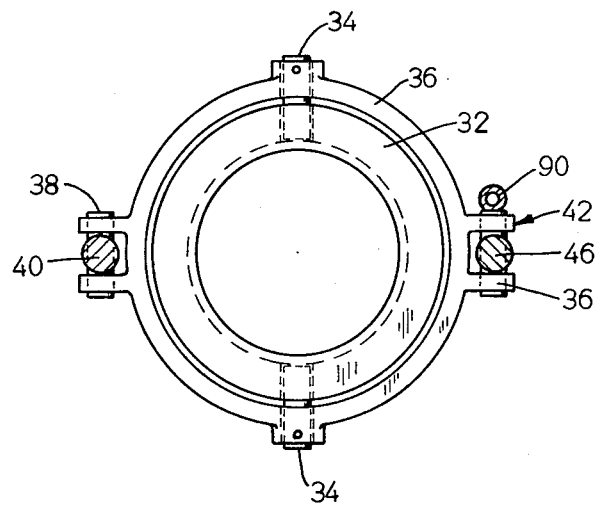
FIG. 7 is a cross sectional view taken along line 7—7 in FIG. 1.

The lever yoke 36 has its movable end 42 engaged with a cross pin 44 on the actuating rod 46 which reciprocates through the housing 22 on an axis parallel to the shafts 8 and 10. This rod may be operated by a hand lever 48 as shown in FIG. 5, or it may be operated in one direction by a compression spring 50 having a seat 52 which is threadedly adjustable to control spring bias as shown in FIG. 6.

Figure 3:
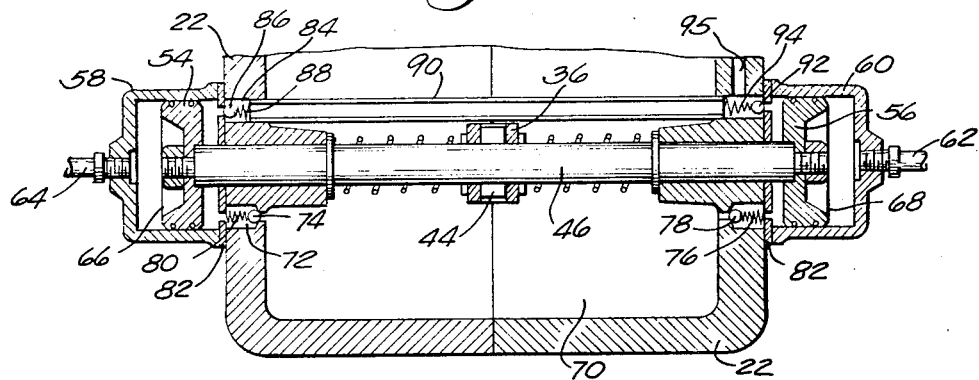
FIG. 3 is a detail view in section on the line 3—3 of FIG. 1.

However, in the preferred arrangement shown in FIG. 1 and FIG. 3, the actuating rod 46 is operated in both directions by fluid pressure. At its respective extremities, it carries pistons 54 and 56 respectively operating in cylinders 58 and 60 separably fastened externally in the housing. For clutch engagement, the pressure of a fluid such as oil or air is supplied through a pipe 62 into the closed end of cylinder 60 to force the piston 56 and the rod 46 toward the left as viewed in FIG. 3, thus oscillating the yoke lever 36 on its fulcrum 38 to cause the spool-shaped pressure plate 28 to compress the disk stack 15 for engagement of the driving and driven disks to transmit motion from the drive shaft 8 through sleeve 18 to the driven shaft 10.

If fluid pressure is delivered through the pipe 64, to the closed end of cylinder 58, the actuating rod 46 is caused to move to the right as viewed in FIG. 3, thereby effecting pressure engagement of the driving and driven disks in pack 25 to clutch the driven shaft to the fixed housing 22 in order to brake the motion of such shaft.

While the outer faces 66 and 68 of the respective pistons 54 and 56 are thus subjected to fluid pressure for brake and clutch actuation, the inner faces of such pistons, operating in the respective cylinders 58 and 60, are used to pump coolant to the disk packs 15 and 25 from a sump 70. In the instant device, for example, the sump is in the bottom of the fixed casing 22 where it receives coolant draining from the packs. As best shown in FIG. 3, there is an opening at 72 leading from the sump into cylinder 58, such opening being controlled by a ball-check valve 74 through which coolant is drawn into cylinder 58 during outward movement of the piston 54 therein.

Similarly, there is a duct at 76 opening from the sump 70 through the wall of the casing 22 into the external cylinder 60, this duct being controlled by a ball-check valve 78 which permits coolant to flow from sump 70 into cylinder 60 during the outward movement of the piston 56. Each of the ball-checks is preferably subject to the bias of a spring 80 seated against a retainer plate 82.

A duct 84 opens from the cylinder 58 and is subject to the control of a check valve ball 86 seated against the pressure plate 82 subject to the bias of a compression spring 88. This arrangement permits coolant to flow from the cylinder 58 through the ball check 86 into an oil tube 90 when the piston 54 is moving inwardly or to the right as shown in FIG. 3.

A similar arrangement permits flow of coolant from cylinder 60 toward the tube 90 past a ball check 92 seated by means of a compression spring 94 against the retainer plate at that end of the device.

A delivery pipe or duct 95 leads from one end of the tube 90 through the casing wall to a pressure chamber 96 encircling the shaft 10 within casing sleeve 85. This chamber is closed at its ends by appropriate seals 98 of any desired construction. The coolant flows from the pressure chamber through the radial ducts 100 to a duct 102 extending axially of the output shaft 10. This duct is plugged at 104 and has discharge branch ducts 106 directed centrally into the respective packs 15 and 25 for the cooling of the disks thereof.

It will be apparent from the foregoing description that in each actuation of each of the disk packs coolant will be pumped from sump 70 and projected into both packs.

It will also be apparent that the same result is achieved if the rod 46 is actuated by hand lever 48 instead of by making use of the pistons to effect fluid actuation thereof.

If the actuating rod 46 is spring-impelled in one direction as shown in FIG. 6, there will only be one-half as many deliveries of coolant, since only piston 56 is being used for this purpose. However, this will be adequate for many purposes.

I claim:

1. A combination brake and clutch which comprises a pair of coaxial disks packs, yoke means including a yoke and a ring pivotally mounted on diametrically opposite sides within said yoke, said yoke means located between said packs and including a pressure plate selectively engageable with said packs, yoke actuating means disposed at one side of said packs and connected to said yoke, a reaction rod disposed at the other side of said packs and with which said yoke is pivotally connected, a housing enclosing said packs and through which said yoke actuating means extends substantially parallel to the axis of said packs, and fluid-operated means outside of the housing and to which said yoke actuating means is connected externally of the housing.

2. A combination brake and clutch according to claim 1 in which driving and driven shafts are in coaxial alignment at opposite ends of the disk packs, the actuating means including a rod substantially parallel with said shafts and connected with said yoke.

3. A combination brake and clutch according to claim 1 in which said housing comprises two parts having abutting surfaces on a plane between said packs and to which the axis of said packs is normal.

4. A combination brake and clutch according to claim 3 in which the two parts of said housing are respectively provided with bearing sleeves through which the said actuating rod extends, the fluid-operated means comprising cylinders externally connected with separate parts of the housing and enclosing said sleeves, and pistons reciprocable in said cylinders and connected to the ends of the actuating rod.

* * * * *